United States Patent
Burckhardt et al.

[15] 3,651,901
[45] Mar. 28, 1972

[54] INSTALLATION FOR THE BRAKE LOCKING PREVENTION

[72] Inventors: Manfred H. Burckhardt, Alte Winnender Steige; Paul Schwerdt, Esslingen-Hebensberg, both of Germany

[73] Assignee: Daimler-Benz Aktiengesellschaft

[22] Filed: Mar. 13, 1970

[21] Appl. No.: 19,285

[30] Foreign Application Priority Data

Mar. 19, 1969 Germany..................P 19 13 813.7

[52] U.S. Cl. ..........................188/181 A, 73/519, 324/174
[51] Int. Cl. ...............................................B60t 8/08
[58] Field of Search..................188/180, 181 A, 181 C; 303/21 C, 21 CE, 21 CF, 21 CG; 73/488, 517 A, 519; 324/167, 174

[56] References Cited

UNITED STATES PATENTS

| | | |
|---|---|---|
| 2,904,135 | 9/1959 | Albright..........................188/181 A |
| 2,914,359 | 11/1959 | Yarber.........................188/181 A X |
| 3,017,145 | 1/1962 | Yarber.........................188/181 A X |
| 3,469,662 | 9/1969 | Dewar............................188/181 A |
| 3,473,120 | 10/1969 | Ruof.................................324/174 X |

Primary Examiner—Duane A. Reger
Attorney—Craig, Antonelli & Hill

[57] ABSTRACT

An installation for preventing the locking of brakes in vehicles, preferably in motor vehicles in which sensing members are provided at the wheels that supply to a common comparator an output signal corresponding to the wheel rotational speed; each sensing member is thereby arranged on the inside of the corresponding wheel mounting, preferably between the inner wheel bearing and outer wheel bearing.

42 Claims, 4 Drawing Figures

INVENTORS
MANFRED H. BURCKHARDT
PAUL SCHWERDT

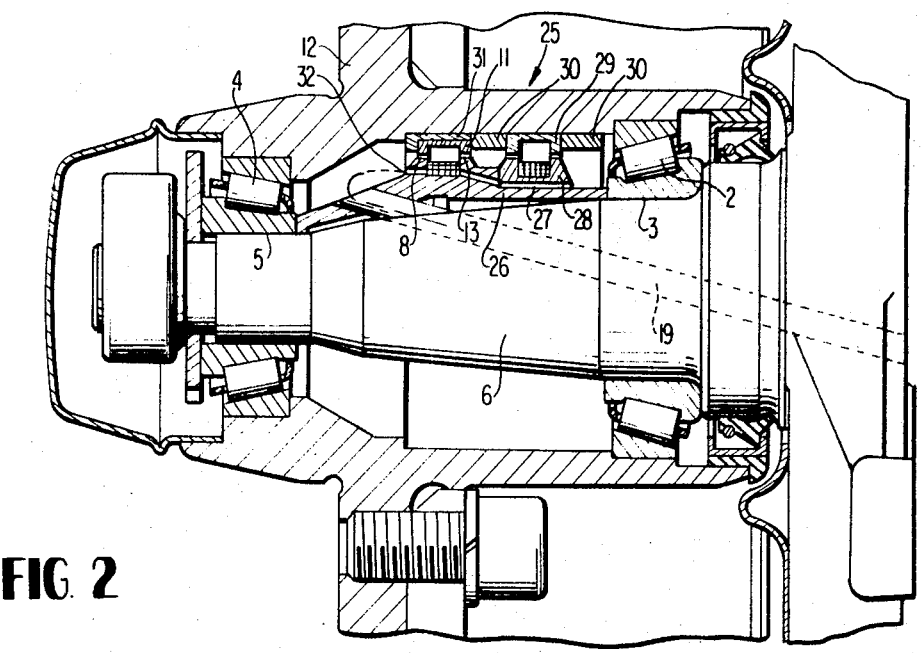
FIG. 2
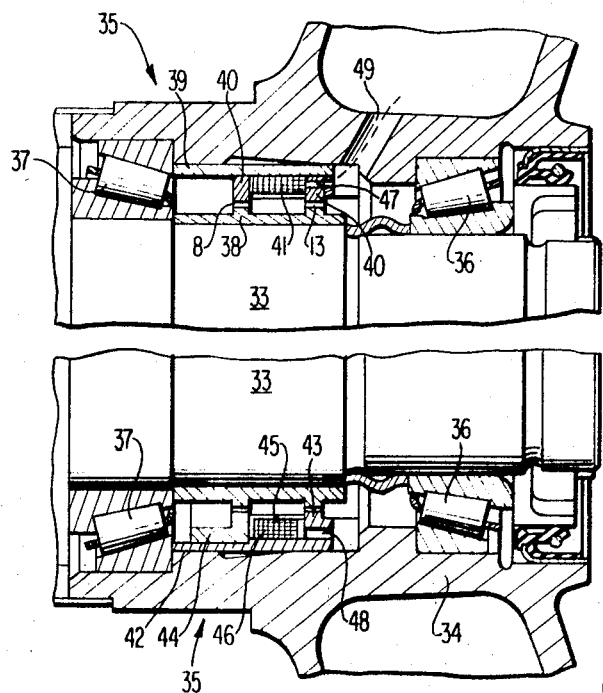
FIG. 3
FIG. 3A
INVENTORS
MANFRED H. BURCKHARDT
PAUL SCHWERDT
BY
ATTORNEYS

INSTALLATION FOR THE BRAKE LOCKING PREVENTION

The present invention relates to an installation for the brake locking prevention in vehicles, preferably in motor vehicles, in which sensing members are provided at the wheels that supply an output signal corresponding to the wheel rotational speed to a common comparator.

These installations serve to prevent the locking of individual wheels of the vehicle if, for example, during the braking the frictional connection between wheel and road surface is exceeded. A locking of the wheels would considerably decrease the driving safety of the vehicle.

Installations are already known in the prior art which serve for detecting or determining the wheel rotational speed such as, for example, a toothed wheel rotating with the vehicle wheel to which is coordinated a magnet and whose flux is of different magnitude corresponding to the mutually opposite teeth or tooth gaps of its mutually facing poles so that with the aid of the induced voltages, a valve is actuated in the brake pressure medium line or is left in its normal position by way of an electronic comparator. Generators and hydraulic pumps are also known in the prior art as pulse transmitters which are each connected externally at a wheel of the motor vehicle. However, these prior art installations entail the disadvantage that they require constructively a large amount of space and that as a result of the very strongly changing and alternating wheel forces an optimum circular motion and therewith a safe signal transmission could not be assured with the prior art mountings of the pulse transmitters. Additionally, the prior art pulse transmitters are very prone to corrosion and damages during the assembly or disassembly of the wheels and/or of the brake discs.

The present invention is predicated on the task to so arrange sensing members, also designated as sensors, at the wheels that the constructive realization of the wheel suspension and wheel mounting is not influenced and an optimum circular motion and a safe and reliable signal transmission is assured also with strongly alternating wheel forces.

The underlying problems are solved in accordance with the present invention in that the sensing members are arranged inside of the wheel mounting preferably between the inner and outer wheel bearing.

Such an arrangement of the sensing member has the advantage that the tested construction of the wheel mounting inclusive the distance of the bearing planes is not influenced and basic changes of existing assembly lines are not necessary.

However, this means, at the same time, that the sensing members can also be installed subsequently into already existing wheel mountings without large expenditures.

An optimum circular motion and a reliable signal transmission is assured by the arrangement of the sensing member between the bearings also with strongly varying or alternating forces because the zone between the bearings is exposed to the smallest loads. The sensing member is additionally corrosion-protected because it is enclosed by the wheel mounting and the latter is sealed toward the outside against soiling. Any accidental damaging during assembly or disassembly of the wheels and brake discs is avoided with certainty because the sensing member is not in any connection with the parts to be disassembled and is protected against direct shock influences by the bearings and the hub body.

The sensing members are constructed preferably in the form of frequency generators and the stator receiving the coils and constructed as bush which is provided with teeth, is mounted on the fixed part of the wheel mounting and the rotor constructed as bush provided with teeth, is mounted on the rotating part of the wheel mounting. The fixed part is thereby, for example, the steering knuckle or axle spindle of a front wheel mounting or the wheel hub carrier of a rear wheel mounting and the rotating part, for example, the wheel hub of a front wheel mounting or the rear axle shaft of a rear wheel mounting.

Accordingly, it is an object of the present invention to provide an installation for the brake locking prevention which avoids by simple and operationally reliable means the aforementioned shortcomings and drawbacks.

Another object of the present invention resides in an installation for the brake locking prevention in vehicles which minimizes the space requirements and assures both optimum circular rotation as well as reliable signal transmission.

A further object of the present invention resides in an installation for preventing the locking of wheels in motor vehicles which is protected against corrosion and damages, particularly during assembly and disassembly of the wheels and/or brakes.

Still another object of the present invention resides in an installation of the type described above which eliminates the need for changes in existing wheel suspensions and permits a subsequent installation into existing vehicles without excessive costs.

These and other objects, features, and advantages of the present invention will become more obvious from the following description when taken in connection with the accompanying drawing which shows, for purposes of illustration only, several embodiments in accordance with the present invention, and wherein:

FIG. 2 is a partial cross-sectional view through the front axle according to FIG. 1 with an installed double-sensing member in accordance with the present invention;

FIG. 3 is a partial longitudinal cross-sectional view through the wheel mounting of a rear axle with an installed sensing member of open-type construction in accordance with the present invention; and FIG. 3a is a longitudinal cross-sectional view through a wheel mounting of a rear axle with an installed sensing member of closed-type construction in accordance with the present invention.

Figure 1:
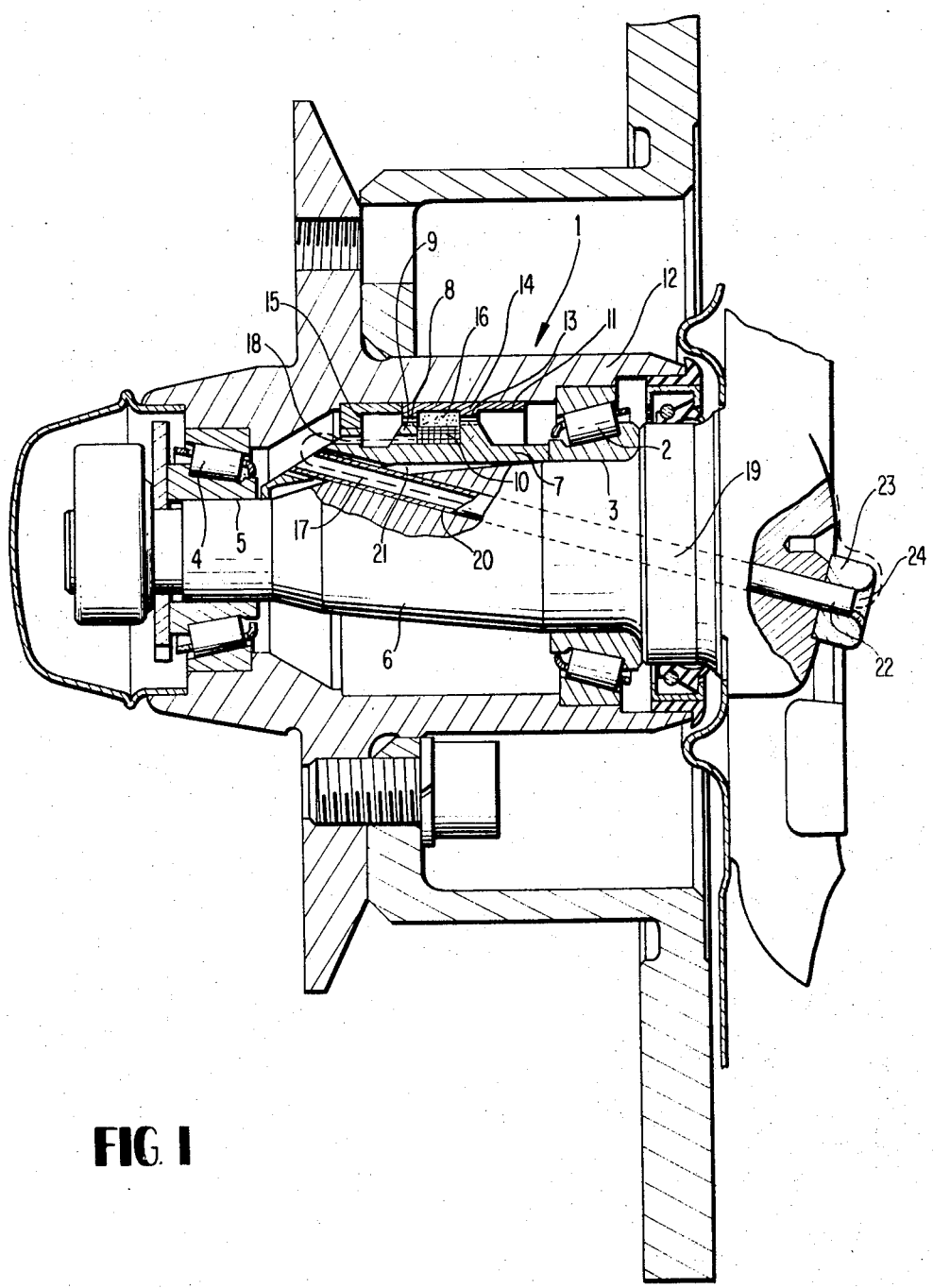
FIG. 1 is a longitudinal cross-sectional view through the wheel mounting of a front axle with an installed sensing member in accordance with the present invention.

Referring now to the drawing wherein like reference numerals are used throughout the various views to designate like parts, and more particularly to FIG. 1, the sensing member generally designated in this figure by reference numeral 1 is arranged between the inner wheel bearing 2 with the bearing seat 3 and the outer wheel bearing 4 with the bearing seat 5 on the axle spindle 6. The stator 7 of the sensing member 1 thereby possesses the cylindrical shape of a bush whose inner contour is so constructed that the bush can be emplaced or slipped over the fixed axle spindle 6 and receives a secure seat with its forward end partially on the bearing seat 3 and with its rear end partially on the bearing seat 5. This has the advantage that the stator 7 consisting of a magnetic material has to be machined only at its forward and rear end since only these two ends abut against the surface-treated bearing seats 3 and 5.

The bush 7 is provided on the surface disposed opposite the seating surface with teeth 8, the leg portions 9 carrying the teeth 8 being parts of the bush 7 itself.

According to the present invention, the coil winding 10 is now mounted on the outer surface of the stator 7 and is enclosed laterally by the leg portions 9 carrying the teeth 8. Since the coil winding 10 is mounted with the aid of the stator 7 on the fixed axle spindle 6 between the bearings 2 and 4, a safe and reliable signal generation and contact means is assured, for slip-rings, sliding brushes and the like are not utilized.

As a further component of the sensing member 1 is illustrated in FIG. 1 the rotor 11 which has the shape of a cylindrical bush whose outer contour is so constructed that the bush is mounted with a snug or tight fit, directly in the rotating part 12 of the wheel mounting, in this case in the wheel hub. The rotor 11 is provided on the surface opposite its seating surface with teeth, the leg portions 14 carrying the teeth 13 being again parts of the rotor itself. The advantage is also obtained by this mounting of the sensing member 1 between the wheel bearings 2 and 4 that as a result of an optimum circular motion the distances between the teeth 8 of the stator 7 and the teeth 13 of the rotor 11 can be kept very small. As a result thereof, the outer diameter of the stator 7 can be constructed large and more teeth can be arranged on the circumference than with stators that do not rotate in a perfect circular motion. A larger number of teeth effects, however, a larger number of pulses per time unit so that even in the lower velocity range at about 20 km./h. a sufficient number of pulses is fed to the comparator and the brake locking prevention installation is effective also at these velocities.

It is favorable if a cylindrical assembly support 15 extends the coil set consisting of stator 7 and rotor 11. This assembly support 15 is mounted in the rotating part 12 of the wheel mounting and prevents that during the assembly of the wheel mounting the teeth of the sensing member 1 are damaged or destroyed.

The number of teeth of the mutually oppositely disposed internal teeth of the rotor 11 and of the external teeth of the stator 7 are the same or are constructed at an integral ratio to each other, preferably at the ratio 1 : 2. They are to be as large as possible and generally 500 teeth per toothed arrangement are provided. However, in a special type of construction of the present invention the possibility also exists to provide on one part of the coil set half the number of teeth if the full number of teeth is present on the other part so that the number of pulses corresponding to the full number of teeth is produced at the output of the sensing member. This type of construction entails advantages during the manufacture of the toothed arrangement. For example, the internal toothed arrangement of the rotor 11 which is difficult to manufacture, may be realized with half the number of teeth by means of a broach whereas the external teeth of the stator 7 which are more easily manufactured are realized with the full number of teeth with the aid of a miller.

It is appropriate that an anti-magnetic filler material 16 such as, for example, Araldite, a casting resin, molybdenum or the like fills the gap between the leg portions 14 carrying the toothed arrangement and that the teeth 8 and 13 as well as the leg portions 9 and 14 are coated with an anti-magnetic protective layer. The molybdenum may thereby be sprayed on, for example, by a conventional plasma metallization process. It is achieved by this measure that no magnetic particles or abrasion which stems, for example, from the roller bearings can deposit itself at the teeth or leg portions or in the gap between the leg portions and can impair or disturb the function of the sensing member 1.

For leading off the electric lines 17 which are illustrated in the drawing in dash line, a bore 18 is provided in the stator 7 and a bore 19 is provided in the axle spindle 6 whereby a line tube 20 bridges the hollow space 21 between stator 7 and axle spindle 6. The line pipe 20 is provided at its outwardly extending end 22 with a reinforcement 23 which serves at the same time during the assembly as limit abutment against an excessive insertion of the line pipe 20 whereby the electric lines 17 would be damaged. The bore 19 is closed by a sticker or adhesive material against penetration of dirt.

In FIG. 2, the mounting of a double sensing member 25 consisting of two sensing members between the bearings 2 and 4 is illustrated in a partial cross-sectional view at the same front axle as in FIG. 1. The stator 26 is mounted as in FIG. 1 on the seating surfaces 3 and 5 of the bearings 2 and 4. It possesses a shoulder 27 on its surface opposite the seating surface; a second sensing member which consists of a stator 28 and of a rotor 29 is placed over the shoulder 27 and is fixed in its position by spacer bushings 30.

Whereas the rotor 11 of the outer sensing member is connected with the rotating part 12 by way of an intermediate support 31, the rotor 29 of the inner sensing member is mounted directly in the rotating part for constructional reasons.

Whereas the rotor 11 of the outer sensing member is connected with the rotating part 12 by way of an intermediate support 31, the rotor 29 of the inner sensing member is mounted directly in the rotating part for constructional reasons.

The electric lines are lead off through a bore 32 in the stator 26 and as already described in FIG. 1 through the bore 19 in the axle spindle 6 to a common comparator.

The number of teeth of the double sensing member are the same pairwise. However, the teeth of the sensing member are phase-shifted with respect to each other by a half a pitch or electrically by 180°. By an addition of the signals from the two sensing members, one thus obtains electrically twice the number of pulses. This has the advantage that the installation according to the present invention operates also at very low vehicle velocities and assures a reliable signal production.

In FIGS. 3 and 3a, representing each one half cross section of an otherwise substantially axially symmetrical construction, a longitudinal cross section through the wheel mounting of the rear axle is illustrated. In this case, as already described, the rotating part of the wheel mounting 33 is the rear axle shaft and the fixed part 34 the wheel hub carrier. The sensing member generally designated by reference numeral 35 is, as already described in FIGS. 1 and 2, mounted between the inner wheel bearing 36 and the outer wheel bearing 37.

FIG. 3 illustrates an open-type of construction of the sensing member 35 and FIG. 3a a closed-type of construction of the sensing member 35. For both types of construction, the rotor 38 which is mounted on the rear axle shaft 33 and presses with its one end face against the inner bearing ring or race of the outer bearing 37, is of the same construction.

Whereas the stator 39, on which are mounted the leg portions 40, carrying the teeth and aligned in the axial direction, between which is disposed the coil winding 31, is constructed as a simple bush which is mounted in the wheel hub carrier 34, in the closed construction of FIG. 3a the stator 42 carries the inner leg portion 43 with the teeth and the outer leg portion 44 carrying the teeth, and a coil body part 45 completely closes off the coil winding 46 toward the outside so that it is protected against damages, soiling and corrosion.

The bore 47 in the leg portion 40 and the bore 49 in the wheel hub carrier 34 serves for leading off the electric lines in the open-type of construction of FIG. 3 whereas the bore 48 in the stator 42 and a similar bore 49 and the wheel hub carrier 34 serves the same purpose in the closed type of construction of FIG. 3a.

It is also possible without any difficulties that double-sensing members as described in connection with FIG. 2 can be installed in the rear axle mounting of FIG. 3 or 3a so that the teachings as regards the construction of the installation according to FIG. 2 may be applied analogously to that of FIGS. 3 and 3a.

The checking and monitoring of all of the sensing members can take place in that a breakage of the windings is monitored by auxiliary electronic means.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are within the scope of the appended claims.

We claim:

1. An installation for the brake locking prevention in vehicles in which sensing means are provided at the wheels that produce an output signal corresponding to the rotational speed of the wheel, and in which a wheel is supported by a wheel mounting means having inner and outer wheel bearing means, characterized in that the sensing means are arranged inside of the wheel mounting means and between the inner and outer wheel bearing means, said sensing means being constructed as frequency generators including a stator mounted on a fixed part of the wheel mounting means and a rotor mounted on a rotating part of the wheel mounting means, and coil means on said stator.

2. An installation according to claim 1, characterized in that the output signals of the wheels is fed to a common comparator of a motor vehicle.

3. An installation according to claim 1, characterized in that the stator has the shape of a cylindrical bush, one of the inner and outer contours of said bush being so constructed as to enable assembly with the fixed part of the wheel mounting means.

4. An installation for the brake locking prevention in vehicles in which sensing means are provided at the wheels that produce an output signal corresponding to the rotational speed of the wheel, and in which a wheel is supported by a wheel mounting means having inner and outer wheel bearing means, characterized in that the sensing means are arranged inside of the wheel mounting means, said sensing means being constructed as frequency generators including a stator mounted on a fixed part of the wheel mounting means and a rotor mounted on a rotating part of the wheel mounting means, and coil means on said stator, said stator having the shape of a cylindrical bush, one of the inner and outer contours of said bush being so constructed as to enable assembly with the fixed part of the wheel mounting means, the inner contour of the bush being so constructed that the bush can be placed over the fixed axle spindle part and securely abuts partly with its forward and rearward end against a bearing seat of the wheel bearing means.

5. An installation according to claim 4, characterized in that the outer contour of the bush is so constructed that the bush can be inserted into the fixed wheel hub carrier forming the relatively fixed part.

6. An installation according to claim 4, characterized in that the stator is provided on its surface opposite the seating surface thereof with tooth means carried by leg portions.

7. An installation according to claim 6, characterized in that said leg portions form part of the stator itself.

8. An installation according to claim 6, characterized in that the leg portions are mounted on said stator.

9. An installation according to claim 6, characterized in that the stator is provided on the surface opposite the seating surface with a shoulder on which is mounted a second sensing means including a stator and a rotor, spacer bushing means for so fixing said second sensing means in its position that the teeth of the sensing means are mutually displaced by half a pitch.

10. An installation according to claim 9, characterized in that the winding of each coil means is mounted on the stator and is enclosed by the respective leg portions carrying the teeth.

11. An installation according to claim 10, characterized in that the winding of the coil means is mounted on the outer surface of the stator.

12. An installation according to claim 10, characterized in that the winding is mounted on the inner surface of the stator.

13. An installation according to claim 10, characterized in that the rotor has the shape of a cylindrical bush whose inner contour is so constructed that the bush is mounted with a tight fit on the rotating part of the wheel mounting means.

14. An installation according to claim 10, characterized in that the rotor has the shape of a cylindrical bush whose external contour is so constructed that the bush can be mounted with a tight fit in the rotating part of the wheel mounting means.

15. An installation according to claim 10, characterized in that the rotor has the shape of a cylindrical bush which is assembled directly onto the rotating part of the wheel mounting means.

16. An installation according to claim 10, characterized in that the rotor has the shape of a cylindrical bush which is assembled onto the rotating part of the wheel mounting means with a tight fit with the aid of an intermediate support.

17. An installation according to claim 10, characterized in that the rotor is provided on its surface opposite the seating surface with tooth means carried by leg portions.

18. An installation according to claim 17, characterized in that said leg portions form a part of the rotor itself.

19. An installation according to claim 17, characterized in that the leg portions are so mounted on the rotor that the teeth of the leg portions are aligned in the axial direction.

20. An installation according to claim 17, characterized in that a cylindrical assembly support extends the coil set consisting of stator and rotor.

21. An installation according to claim 17, characterized in that the number of teeth of internal and external tooth means of the coil set are identical.

22. An installation according to claim 17, characterized in that the number of teeth of the internal and external tooth means of the coil set are constructed at an integral ratio.

23. An installation according to claim 22, characterized in that said ratio is 1 : 2.

24. An installation according to claim 17, characterized in that an anti-magnetic filler material fills the gaps between the leg portions carrying the tooth means, and in that the teeth and leg portions are coated with an anti-magnetic protective layer.

25. An installation according to claim 24, characterized in that bores are provided in the stator and in the fixed part of the wheel mounting means carrying the stator for leading off the electric lines.

26. An installation according to claim 25, characterized in that the sensing means are arranged between the inner and outer wheel bearing means.

27. An installation according to claim 1, characterized in that the stator is provided on its surface opposite the seating surface thereof with tooth means carried by leg portions.

28. An installation according to claim 27, characterized in that said leg portions form part of the stator itself.

29. An installation according to claim 27, characterized in that the leg portions are mounted on said stator.

30. An installation according to claim 1, characterized in that the stator is provided on the surface opposite the seating surface with a shoulder on which is mounted a second sensing means including a stator and a rotor, spacer bushing means for so fixing said second sensing means in its position that the teeth of the sensing means are mutually displaced by half a pitch.

31. An installation according to claim 27, characterized in that the winding of each coil means is mounted on the stator and is enclosed by the respective leg portions carrying the teeth.

32. An installation according to claim 1, characterized in that the rotor has the shape of a cylindrical bush whose inner contour is so constructed that the bush is mounted with a tight fit on the rotating part of the wheel mounting means.

33. An installation according to claim 1, characterized in that the rotor has the shape of a cylindrical bush whose external contour is so constructed that the bush can be mounted with a tight fit in the rotating part of the wheel mounting means.

34. An installation according to claim 1, characterized in that the rotor has the shape of a cylindrical bush which is assembled onto the rotating part of the wheel mounting means with a tight fit with the aid of an intermediate support.

35. An installation according to claim 27, characterized in that the rotor is provided on its surface opposite the seating surface with tooth means carried by leg portions.

36. An installation according to claim 35, characterized in that the leg portions are so mounted on the rotor that the teeth of the leg portions are aligned in the axial direction.

37. An installation according to claim 1, characterized in that a cylindrical assembly support extends the coil set consisting of stator and rotor.

38. An installation according to claim 35, characterized in that the number of teeth of the internal and external tooth means of the coil set are identical.

39. An installation according to claim 35, characterized in that the number of teeth of the internal and external tooth means of the coil set are constructed at an integral ratio.

40. An installation according to claim 39, characterized in that said ratio is 1 : 2.

41. An installation according to claim 35, characterized in that an anti-magnetic filler material fills the gaps between the leg portions carrying the tooth means, and in that the teeth and leg portions are coated with an anti-magnetic protective layer.

42. An installation according to claim 1, characterized in that bores are provided in the stator and in the fixed part of the wheel mounting means carrying the stator for leading off the electric lines.

* * * * *